United States Patent
Chinnici et al.

(10) Patent No.: US 9,461,773 B2
(45) Date of Patent: Oct. 4, 2016

(54) METHOD AND A NODE FOR DETECTING PHASE NOISE IN MIMO COMMUNICATION SYSTEMS

(76) Inventors: Stefano Chinnici, Milan (IT); Mats Rydstrom, Billdal (SE); Alberto Tarable, Alpignano (IT); Guido Montorsi, Turin (IT)

( * ) Notice: Subject to any disclaimer, the term of this patent is extended or adjusted under 35 U.S.C. 154(b) by 0 days.

(21) Appl. No.: 14/420,352

(22) PCT Filed: Aug. 9, 2012

(86) PCT No.: PCT/EP2012/065622
§ 371 (c)(1),
(2), (4) Date: Feb. 6, 2015

(87) PCT Pub. No.: WO2014/023355
PCT Pub. Date: Feb. 13, 2014

(65) Prior Publication Data
US 2015/0215071 A1   Jul. 30, 2015

(51) Int. Cl.
*H03D 1/00* (2006.01)
*H04L 27/06* (2006.01)
*H04L 1/00* (2006.01)
(Continued)

(52) U.S. Cl.
CPC .......... *H04L 1/0054* (2013.01); *H04B 7/0413* (2013.01); *H04L 7/0087* (2013.01); *H04L 7/0331* (2013.01); *H04L 25/0204* (2013.01); *H04L 27/0014* (2013.01); *H04L 25/0232* (2013.01); *H04L 27/266* (2013.01); *H04L 27/2659* (2013.01); *H04L 2027/0067* (2013.01)

(58) Field of Classification Search
CPC ... H04L 1/0054; H04L 1/005; H04L 25/067; H04L 1/0066; H04L 25/03038; H04L 27/2647; H04L 2025/03414; H04L 25/03057; H03M 13/41; H03M 13/4107; H03M 13/6502; G11B 20/10009; H04B 1/1036
USPC ................ 375/140–141, 147–148, 259–265, 375/340–341, 316, 346–350
See application file for complete search history.

(56) References Cited

U.S. PATENT DOCUMENTS 5,576,715 A * 11/1996 Litton ..................... G01S 19/29
342/352
6,826,240 B1 * 11/2004 Thomas .............. H04L 25/0204
375/340

(Continued)

OTHER PUBLICATIONS

PCT International Search Report, mailed Jun. 3, 2013, in connection with International Application No. PCT/EP2012/065622, all pages.

(Continued)

*Primary Examiner* — James M Perez
(74) *Attorney, Agent, or Firm* — Leffler Intellectual Property Law, PLLC

(57) ABSTRACT

A method for phase noise detection in a MIMO communication system comprises the step of computing an initial estimate of phase using received pilot symbols. A phase follows for interpolating between successive pilot symbol phase estimates to obtain a coarse resolution reference phase estimate. Then, it follows a phase for computing a fine resolution estimate of phase using said coarse resolution phase estimate together with data expressing characteristics of known phase noise processes, applying an expectation maximization (EM) algorithm. The application of the EM algorithm can be further refined using improved symbol decisions from a FEC decoding.

7 Claims, 5 Drawing Sheets

(51) Int. Cl.
  *H04L 25/02* (2006.01)
  *H04L 27/00* (2006.01)
  *H04B 7/04* (2006.01)
  *H04L 7/00* (2006.01)
  *H04L 7/033* (2006.01)
  *H04L 27/26* (2006.01)

(56) References Cited

U.S. PATENT DOCUMENTS

| | | | | |
|---|---|---|---|---|
| 7,050,513 B1* | 5/2006 | Yakhnich | H04L 25/0242 | 375/233 |
| 7,054,354 B2* | 5/2006 | Gorokhov | H04L 25/03159 | 375/148 |
| 7,206,349 B2* | 4/2007 | Linnartz | H04L 25/03038 | 375/260 |
| 8,170,081 B2* | 5/2012 | Forenza | H04B 7/0417 | 370/278 |
| 8,411,806 B1* | 4/2013 | Lee | H04L 25/03305 | 375/340 |
| 8,792,594 B2* | 7/2014 | Vojcic | H04L 1/005 | 375/233 |
| 8,908,817 B1* | 12/2014 | Rydstrom | H04B 7/084 | 375/144 |
| 2001/0026584 A1* | 10/2001 | Sommer | H04L 1/0047 | 375/233 |
| 2004/0171366 A1* | 9/2004 | Bar-Ness | H04L 25/022 | 455/278.1 |
| 2004/0218706 A1* | 11/2004 | Bougeard | H04L 25/06 | 375/371 |
| 2004/0240481 A1* | 12/2004 | Matsumoto | H03M 13/1102 | 370/516 |
| 2005/0111603 A1* | 5/2005 | Ginesi | H04L 27/0014 | 375/362 |
| 2005/0190868 A1* | 9/2005 | Khandekar | H04L 1/005 | 375/346 |
| 2006/0221808 A1* | 10/2006 | Shirakata | H04B 7/0848 | 370/203 |
| 2006/0239367 A1* | 10/2006 | Wilhelmsson | H04L 25/03006 | 375/260 |
| 2006/0251198 A1* | 11/2006 | Ma | H04L 25/022 | 375/350 |
| 2006/0274861 A1* | 12/2006 | Langenbach | H04L 25/03197 | 375/341 |
| 2008/0181097 A1* | 7/2008 | Goldberg | H04B 1/71637 | 370/210 |
| 2010/0034219 A1* | 2/2010 | Stadelmeier | H04N 21/4385 | 370/478 |
| 2010/0158085 A1* | 6/2010 | Khayrallah | H04L 25/03318 | 375/222 |
| 2011/0002371 A1* | 1/2011 | Forenza | H04B 7/0417 | 375/227 |
| 2014/0105322 A1* | 4/2014 | Ouchi | H04L 25/03891 | 375/295 |
| 2014/0211833 A1* | 7/2014 | Schoeneich | H04L 25/022 | 375/219 |
| 2014/0247910 A1* | 9/2014 | Drumm | H03M 13/2957 | 375/341 |
| 2014/0281786 A1* | 9/2014 | Ueng | H03M 13/114 | 714/752 |
| 2014/0294122 A1* | 10/2014 | Detert | H04L 25/03171 | 375/308 |
| 2014/0348277 A1* | 11/2014 | Rydstrom | H04B 7/084 | 375/350 |

OTHER PUBLICATIONS

PCT Written Opinion, mailed Jun. 3, 2013, in connection with International Application No. PCT/EP2012/065622, all pages.

Benedetto, S. et al. "Modulation, coding and signal processing for wireless communications—MHOMS: High-speed ACM modem for Satellite Applications" IEEE Wireless Communications, Piscataway, NJ, US, vol. 12, No. 2, Apr. 2005, pp. 66-77, XP011130575, ISSN: 1536-1284.

Lee, Jong-Ho et al. "Joint Channel Estimation and Phase Noise Suppression for OFDM Systems" IEEE 2005 61st Vehicular Technology Conference, May 30, 2005-Jun. 1, 2005, Stockholm, Sweden, IEEE, Piscataway, NJ, US, vol. 1, May 30, 2005, pp. 467-470, XP010855437, ISBN: 978-0-7803-8887-1.

* cited by examiner

METHOD AND A NODE FOR DETECTING PHASE NOISE IN MIMO COMMUNICATION SYSTEMS

TECHNICAL FIELD

The present invention relates to phase synchronization in communication systems, and is specifically directed to a method and a node for detecting phase noise in a MIMO (multiple-input multiple-output) communication system.

BACKGROUND

In a communication system, transmitted RF frequency waveforms are received and demodulated. Modern wireless communication systems aim at achieving high spectral efficiency at lowest possible cost, in channels which are limited in band and power.

When system constraints and physical channel characteristics suggest the use of single carrier modulations, the most straightforward way to achieve high spectral efficiency is to use high order modulations, e.g., M-QAM (Quadrature Amplitude Modulation), with M large. Very often, the resulting scenario is one where the channel seen at the receiver is no longer dominated by the physical channel, e.g., frequency selective fading and/or additive white noise, but by hardware impairments introduced by the transmission equipment itself.

One of the most common sources of impairment when dealing with high order dense modulations at high carrier frequencies is the phase noise arising from non-idealities in system oscillators, in turn caused by constraints on the power and cost of oscillator components, which then show nonlinearities and noise effects.

A classical solution to the problem of non-ideal oscillators (i.e. phase noise) is to use a phase-synchronous detector where the phase noise is compensated for by some type of phase tracking system, e.g., a PLL based system. Acquisition is almost always based on pilot insertion, that has a detrimental effect on overall efficiency, while steady-state tracking can be either data-aided (DA), when pilots are used, or non data-aided, e.g. when decision on received symbols are used. As an alternative to the PLL phase tracking approach, a phase detector based on a Kalman filter can be envisaged.

The detector performance can be further improved if the phase detection is performed jointly together with iterative decoding of a modern FEC code (i.e. an LDPC code). The general idea then is to exploit the higher quality symbol estimates available after some iterations of the FEC decoder to derive a refined estimate of the phase. The refined phase estimate is used to re-compute the FEC input, and the process is iterated. A number of alternative approaches to iterative phase tracking have been proposed in the literature. One approach involves the feedback of more reliable symbol decisions, either hard or soft, to the phase detector. Another approach dispenses with the phase detector altogether and replaces it with a factor graph representation of the phase process, which is used to iteratively estimate the time evolving phase. In this last solution the complexity of the receiver is very high, since the phase detector and the FEC decoder both use iterative algorithms described on graphs.

When spectral efficiency needs to be pushed further, beyond that achievable by conventional SISO (Single-Input Single-Output) transmission systems, MIMO (Multiple-Input Multiple-Output) systems can be exploited. The underlying system comprises a transmitter and a receiver, both with a certain number of antennas.

In the case of microwave transmission, this multidimensional channel is a Line-of-Sight channel with comparably small number of transmit and receive antennas. In spite of the low complexity of the channel matrix, the problem of dealing with phase noise in MIMO systems is significantly more complex than in the SISO case. While in the SISO case the phase errors at the transmitter and receiver sides simply sum to each other, in the MIMO case the phase processes observed at the receiver contains also the weighted contributions of the elementary, atomic phase processes, of all the transmitters. These atomic processes can not be observed directly at the receiver, therefore known methods commonly adopted in SISO systems can not be used to estimate their contribution to the total phase noise at the receiver side.

Extensions of the PLL based approaches have been proposed, but these extensions involve the critical assumption of having identical oscillators for all transmit and receive antennas, respectively. This is evidently a simplified approach which does not lead to satisfactory results. Further extensions of the joint phase tracking schemes are possible as well, with a higher complexity, especially in the case of the factor-graph based approaches.

All in all, straightforward extensions of solutions designed for the SISO case have several shortcomings. The simple replication of the PLL scheme used in SISO case leads to unacceptable performance since the estimate of the phase noise sum processes is not good enough to ensure recovery of the signal at the receiver.

Not straightforward extensions of the SISO PLL scheme have been proposed, but their high complexity is such that their practical use has been discarded.

Extension of the type of advanced SISO joint solutions based on factor graphs is not straightforward, mainly due to the conceptual problems associated with the correlation of the phase processes in the MIMO case.

SUMMARY

The above-mentioned problem and others are solved by the invention, which is based on an iterative phase estimator and a novel application of the expectation-maximization (EM) algorithm. The invention, and particularly the described algorithms, are especially suited for Line-of-Sight (LoS) multiple-input multiple-output (MIMO) communication systems.

In the present invention, an initial estimate of phase is computed using transmitted pilot symbols. This initial estimate, after interpolation between successive pilot symbol phase estimates, provides a coarse resolution reference phase estimate for all symbols including data and pilot symbols. A fine resolution phase estimate is then computed using this coarse phase estimate together with a-priori knowledge of the characteristics of involved phase noise processes and the expectation maximization (EM) algorithm.

The proposed invention avoids the weaknesses inherent in the classical PLL or Kalman based phase noise tracking systems, addressing both the scalability of the solution to the MIMO case and the performance side. In addition, the method can be extended to cover joint phase estimation and FEC decoding.

The EM algorithm is used to compute a-posteriori probabilities of transmitted symbols given the phase noise process properties and the received sequence.

The application of the EM method can be further refined by using improved symbol decisions from FEC decoding, when an FEC capable of feeding back coded symbols information is employed by the system. In this case the method becomes a joint phase and FEC decoding method for the MIMO receiver.

The invention is also directed to a node to detect phase noise in a MIMO communication system, and also to an article of manufacture comprising a program storage memory having computer readable program code embodied therein to detect phase noise in a MIMO communication system.

The invention will now be described more in detail with the aid of preferred embodiments in connection with the enclosed drawings.

DETAILED DESCRIPTION

Figure 1:
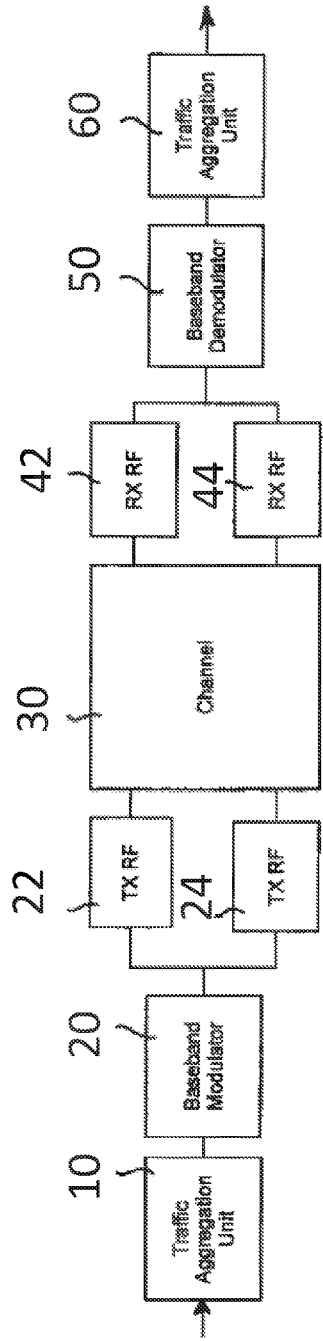
FIG. 1 is a block schematic illustration of a MIMO communication system.

One possible embodiment of this invention is in a wireless Line-of-Sight (LoS) MIMO (Multiple-Input Multiple-Output) communication system. FIG. 1 schematically illustrates a Line-of-Sight MIMO wireless communication system, which without loss of generality, and for the sole purpose of simplifying the description of the present invention, is assumed to include two transmit and two receive antennas. As it can be promptly seen by one skilled in the art reading the present description, the invention can be extended to cover the case of Line-of-Sight MIMO communication systems having a number of transmit and receive antennas higher than two.

The transmit side of the communication system comprises a generic traffic aggregation unit 10, which for example aggregates IP packets with TDM circuit switched traffic, and a baseband modulator element 20, possibly including filtering, which sends its output to two substantially identical transmit radio-frequency (RF) transmitters, 22, 24 (which can be more than two in the more general case). The transmission takes place in a MIMO channel 30, whose model is later explained in more details.

At the receive side, the MIMO communication system comprises two substantially identical receive radio-frequency (RF) receivers, 42, 44 (which again can be more than two in the more general case) which deliver the received traffic to a baseband demodulator 50 which in turn connects to a receive generic traffic aggregation unit 60.

In the following it is assumed without loss of generality that the communication system uses single carrier transmission. Other embodiments may see application of this method to a multi carrier transmission system such as OFDM.

Figure 2:
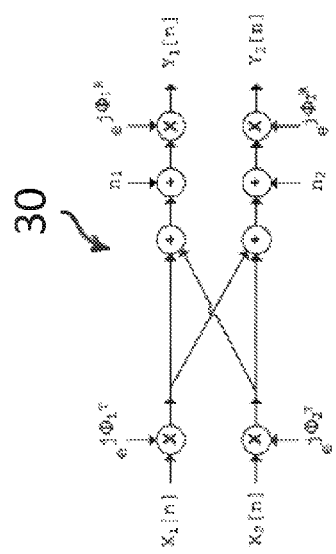
FIG. 2 is a block schematic model of a MIMO Line-of-Sight channel, with the addition of the transmitter and receiver phase noise contributions.

FIG. 2 shows a model for the 2×2 MIMO channel 30, which includes AWGN noise and separate and independent phase noise processes for each transmit and receive lineup, where:

$x_1[n]$ and $x_2[n]$ are transmitted symbol sequence components $\Phi_1^T$ and $\Phi_2^T$ are the transmitter phase noise processes $\Phi_1^R$ and $\Phi_2^R$ are the receiver phase noise processes $n_1$ and $n_2$ are the additive white noise processes $y_1[n]$ and $y_1[n]$ are the received symbol sequence components The observable quantities at the two receiving antennas are the phase noise sum processes, while the atomic processes shown in the figure are hidden variables of our system. Our invention allows the receiver to estimate the atomic processes from the observable ones.

Note that even if FIG. 2 shows a system with two transmit and two receive antennas, our results can be extended to any number of transmit and receive antennas.

In a typical communication system, the receiver has to perform channel estimation using a number of pilot symbols, sometimes referred to as a training sequence. In this way the receiver is able to derive an estimate of the relevant channel parameters, which in the considered application are essentially the realizations of stochastic phase noise processes. The instantaneous estimates of channel parameters are then used by the receiver to separate the various data streams.

Figure 3:
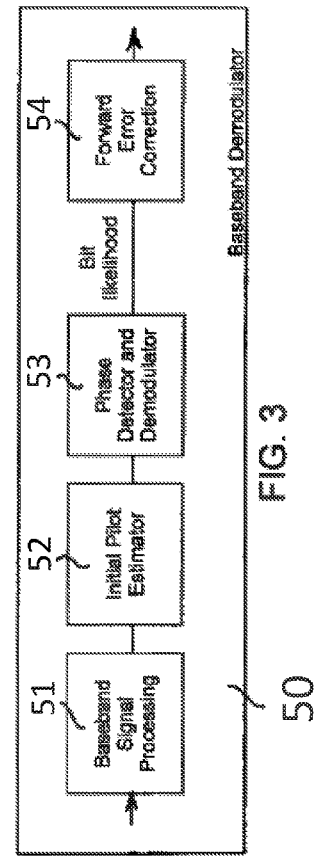
FIG. 3 is a schematic diagram of a system for an improved phase detection according to a first embodiment of the present invention.

The schematic block diagram in FIG. 3 illustrates a first possible application of the invention to the system shown in FIG. 1. The baseband demodulator 50 comprises a known baseband signal processing 51 which delivers its output to an initial pilot estimator block 52, where pilot symbols are used to derive an initial estimate of the phase, which is then fed together with the received symbols into a phase detector and demodulator block 53.

Figure 4:
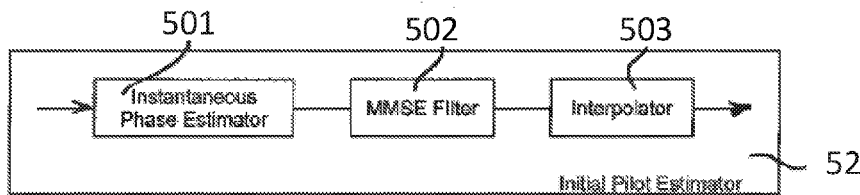
FIG. 4 is a schematic diagram which details an initial pilot estimator of the system of FIG. 3.

The initial pilot estimator block 52 is expanded in FIG. 4. It comprises an instantaneous phase estimator 501, followed by an MMSE filter 502 and a linear interpolator 503. Both the MMSE filter 502 and linear interpolator 503 per se are known in the art.

Figure 5:
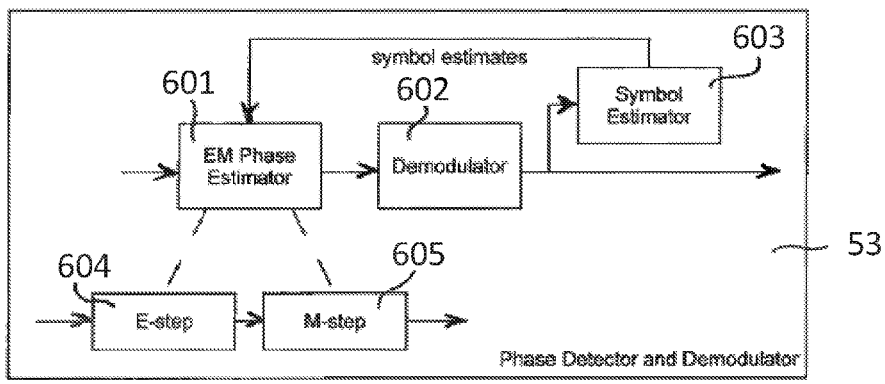
FIG. 5 is a schematic diagram which details a phase detector and demodulator of the system of FIG. 3.

The phase detector and demodulator block 53 of FIG. 3 is expanded and further detailed in FIG. 5. It comprises an expectation-maximization (EM) based phase estimator 601, a demodulator 602 and an information symbol estimator 603 which is configured to feed symbol estimates back to the EM based phase estimator 601. The EM-based phase estimator 601 is preferably further divided into an E-step 604 and an M-step 605.

Figures 6, 7:
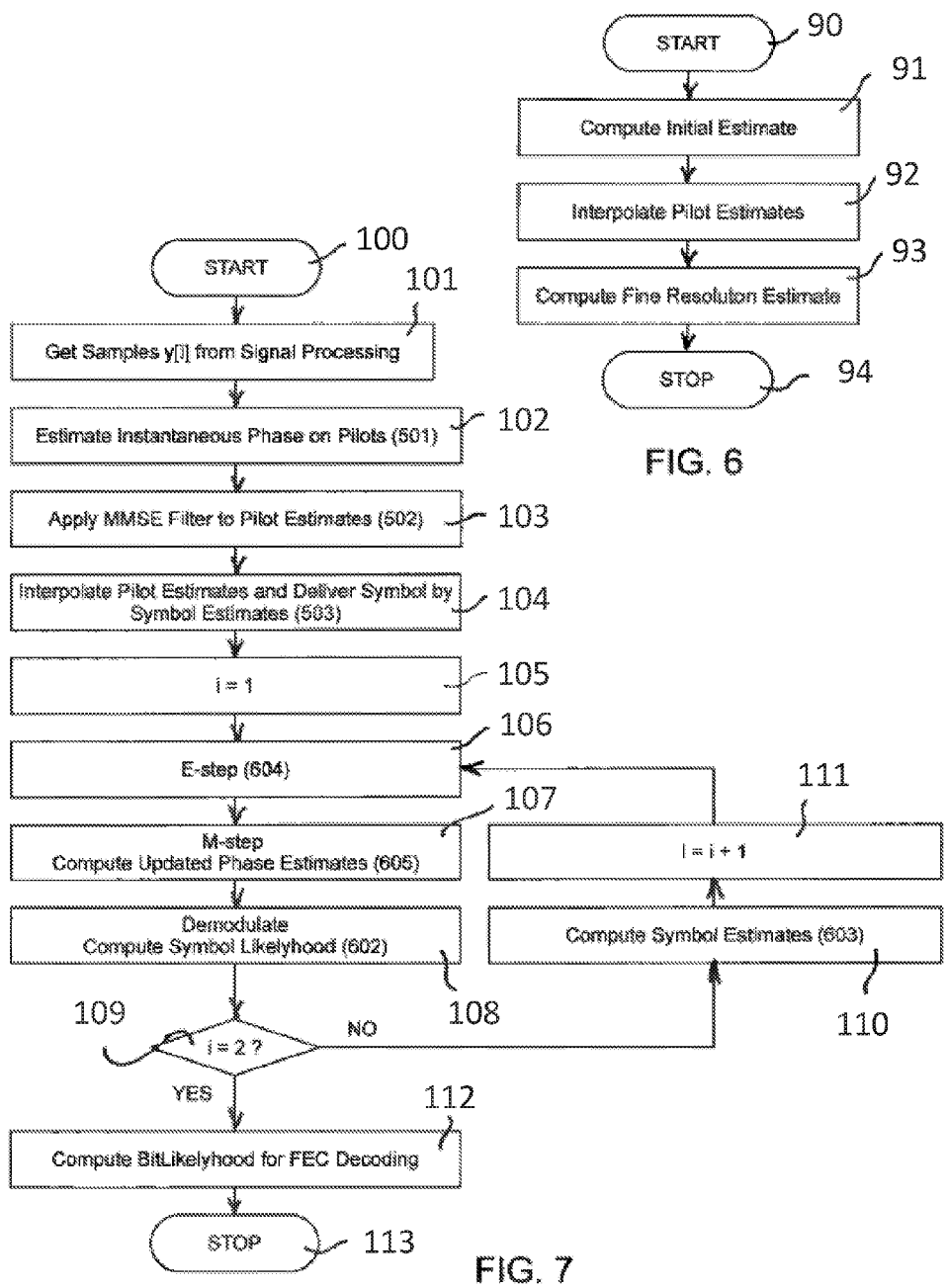
FIG. 6 is a schematic flow diagram of a method for detecting phase noise according the invention.
FIG. 7 is a flow diagram of a method for detecting phase noise using the system of FIG. 3.

A basic temporal sequence of operations on which the present invention is based is illustrated in FIG. 6. The method starts at 90. In a first general step 91, an initial estimate of phase is computed using received pilot symbols. In a subsequent general step 92, the method provides an interpolation between successive pilot symbol phase estimates to obtain a coarse resolution reference phase estimate. In a subsequent general step 92, the method provides computation of a fine resolution estimate of phase using said coarse resolution phase estimate together with data expressing characteristics of known phase noise processes, applying an expectation maximization (EM) algorithm. The process ends at step 94.

In a first specific embodiment, a temporal sequence of operations is illustrated in FIG. 7, where only one feedback iteration is employed as a specific embodiment. It should however be noted that any number of iterations may be used, should a greater refinement of the result be needed or desired.

With reference to FIG. 7, the method starts at 100. In a first step 101, samples y[i] are obtained from signal processing. It should be noted that all blocks operate on this received symbol vector of samples received at all receive antennas.

In step 102, the instantaneous phase estimator 501 delivers a maximum likelihood instantaneous estimate of the phase noise sum processes, which is then filtered by the MMSE filter 502 (step 103) and then interpolated 503 to deliver a phase value for all incoming symbols (step 104). The MMSE filter 502 takes into account the MIMO channel structure, and delivers the estimates of the atomic phase processes from the observable quantities, which are the phase noise sum processes estimates produced by the instantaneous phase estimator 501.

The EM based phase detector is based on a factorization of the a-posteriori channel law $$f(\{x[n], \phi_j^T[n], \phi_i^R[n]\}_{i,j,n} | \{y[n]\}_n) =$$
$$\prod_j f_{A,j}(\phi_j^T) \prod_i f_{B,i}(\phi_i^R) \times \prod_n f_{C,n}(x[n] | \{\phi_j^T[n]\}_j, \{\phi_i^R[n]\}_i, y[n])$$

where:
f( ) represents any given function,
x[n] is the transmitted symbol sequence,
y[n] is the received symbol sequence and
the various φ[n] terms represent the atomic phase noise processes.

It should be noted that the separate contribution of the atomic phase noise processes, which are hidden variables for the solution of the problem, are jointly estimated from the received observables.

The beginning of a single iteration phase is set at step 105.

The iteration process begins with step 106 where the E-step 604 (expectation) computes the a-posteriori likelihood function of the transmitted sequence and phase noise realization given the received signal according to the following formula:

$$h_n(\phi[n]) = E_{x[n]} \log f_{C,n}(x[n] | \{\phi_j^T[n]\}_j, \{\phi_i^R[n]\}_i, y[n])$$

where, again,
f( ) represents any given function,
x[n] is the transmitted symbol sequence,
y[n] is the received symbol sequence, and
the various φ[n] terms represent the atomic phase noise processes.

In subsequent step 107, the M-step 605 (maximization) computes an estimate of instantaneous phase noise realization by maximizing the likelihood function computed in the E-step, i.e.:

$$\hat{\phi} = \arg\max_\phi \left( \sum_j \log f_{A,j}(\phi_j^T) + \sum_i \log f_{B,i}(\phi_i^R) + \sum_n h_n(\phi[n]) \right)$$

where:
log( ) denotes the logarithmic function and
φ̂ is an estimate of phase.

Depending on the phase noise process probability density function, the maximization step 107 may not have a closed form solution. In this case, several methods known in literature can be applied to numerically approximate the maximization step. One such method well known in the art is the steepest gradient descent algorithm.

In the next step 108, the demodulator 602 computes symbol likelihoods based on a-priori knowledge of modulation format, the received signal, and the estimate of phase noise realization from the EM based phase estimator 601.

The process is iterated at block 109. If the set number of iterations has not yet been reached, then process goes to step 110, where the information symbol estimator block 603 receives the symbol likelihoods from the EM based phase estimator 601 (comprising the E-step 604 and the M-step 605), computes the corresponding symbol estimates and feeds back this information to the EM based phase estimator 601, particularly to its E-step 604 performed at block 106. The iteration counter is increased at step 111.

At the end of the set number of iterations, the process continues with step 112 where bit likelihood is computed for FEC decoding before this part of the process ends at step 113. Since the FEC decoder is normally a binary one, a conversion symbol to bit has to be effected. However, should the decoder be a non-binary one, the conversion symbol to bit might not be required, and the process could proceed with operations on symbols only.

Figure 8:
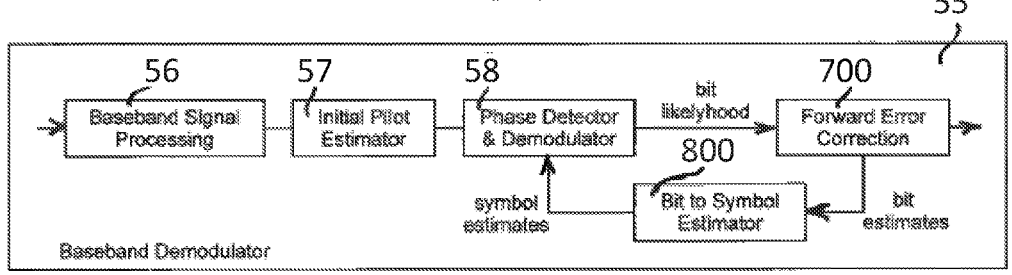
FIG. 8 is a schematic diagram of a system for an improved phase detection according to a second embodiment of the present invention.

A second embodiment of the present invention is shown in FIG. 8. This embodiment is preferably part of a LoS-MIMO wireless communication system, such as the one shown in FIG. 1, where any FEC capable of feeding back refined coded bits information can be used. The FEC could be any code known in the art which fulfills the above stated condition, for example but not limited to, an LDPC or turbo code.

The schematic block diagram in FIG. 8 illustrates a baseband demodulator 55. It comprises a known baseband signal processing 56 which delivers its output to an initial pilot estimator block 57, which is the same as the one previously described with reference to FIG. 4, and which therefore comprises an instantaneous phase estimator 501, followed by an MMSE filter 502 and a linear interpolator 503.

In this initial pilot estimator block 57, pilot symbols are used to derive an initial estimate of the phase, which is then fed together with the received symbols into a phase detector and demodulator block 58, comprising many components which are the same as the ones previously described with reference to the demodulator block 53 of FIG. 5.

Figure 9:
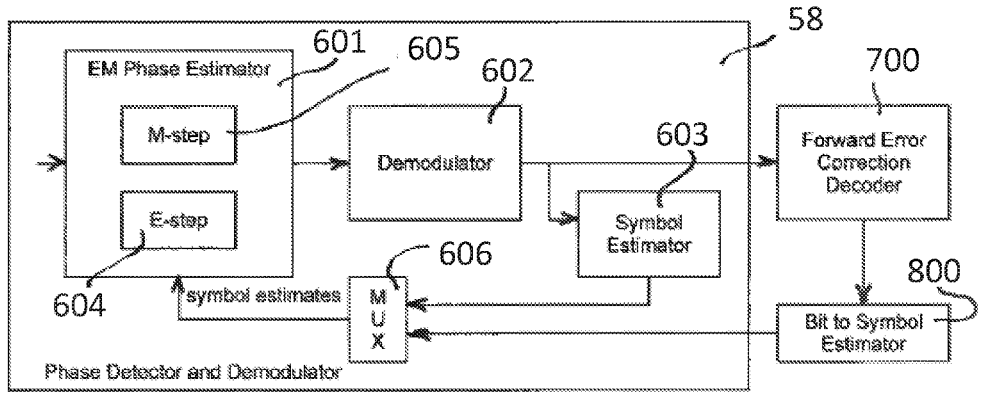
FIG. 9 is a schematic diagram which details a phase detector and demodulator of the system of FIG. 8.

The phase detector and demodulator block 58 is expanded and further detailed in FIG. 9. It comprises, as for the demodulator block 53, an expectation-maximization (EM) based phase estimator 601, a demodulator 602 and an information symbol estimator 603. The EM-based phase estimator 601 is preferably further divided into an E-step 604 and an M-step 605.

In this second embodiment of the invention, an iterative FEC decoder 700 feeds back the refined bit estimates, taken after a given number of iterations, to the bit to symbol estimator 800, which in turns feeds the symbol estimates back to the phase detector and demodulator 58. It has to be noted that the reliability of the symbols derived from bit estimates taken after a given number of iterations is higher than the initial symbol estimates, therefore using these refined symbol estimates will lead to a better estimate of the phase noise process, and vice versa.

The symbol estimates coming from the symbol estimator 603 and from the bit-to-symbol estimator 800 are combined in the MUX 606 and then fed back to the EM based phase estimator 601.

It is also possible to use in the scheme of FIG. 9 any FEC capable of feeding back refined coded symbol information.

Figure 10:
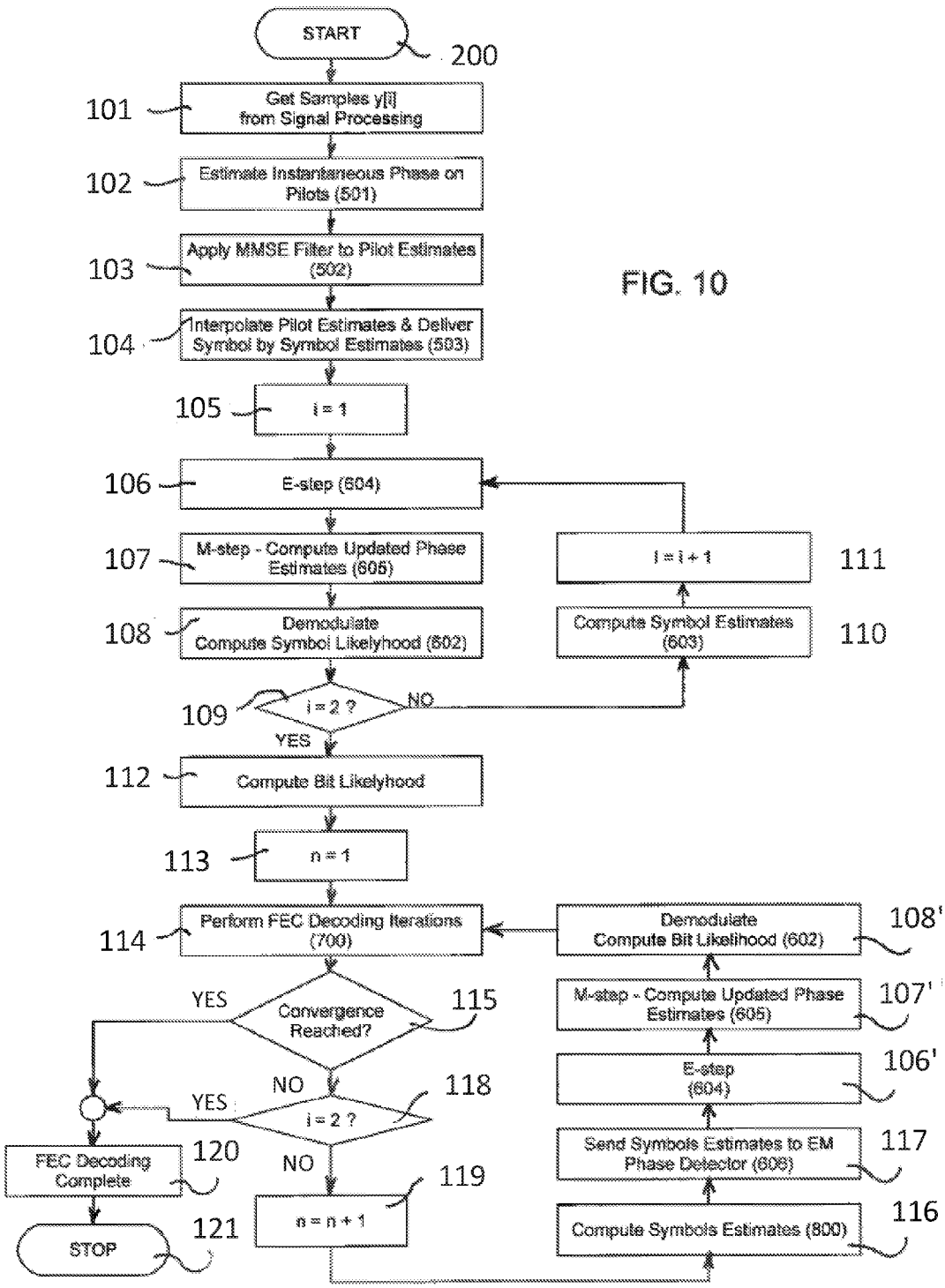
FIG. 10 is a flow diagram of a method for detecting phase noise using the system of FIG. 8.

With reference to FIG. 10, the method related to this second embodiment of the invention starts at 200. As said before, the initial pilot estimator block 500 is identical to that of the first embodiment detailed before. Moreover, all process steps up to the output of the first iteration phase 109 and the computation of bit likelihood 112 are the same as described before, and have been indicated in FIG. 10 with the same reference number. In this embodiment the phase detector and demodulator 58 computes phase noise realization estimate exactly as was described in the first embodiment above.

As shown in FIG. 9, the estimated phase noise realization is used by the demodulator 602 to compute the transmitted symbol probabilities, e.g. in the form of log-likelihood ratios. The log-likelihood ratios are then fed into the symbol estimator 603, which computes the symbol estimates and feeds back this information to the EM phase estimator 601, as in the first embodiment. Assuming without loss of generality that a single iteration is performed in the phase detector and demodulator 58, the symbol log-likelihoods are converted into bit error log-likelihoods, suitable for FEC decoding, in step 112, which are fed to the FEC decoder 700.

The following iteration sub-process is based upon the reach of a convergence, by setting a convergence threshold. A counter is however also set in step 113 in order to exit the iteration sub-process in case convergence is not reached.

Assuming that the system employs an iteratively decoded FEC, the FEC decoder 700 performs a given number of decoding iterations (step 114), which can be selected from 1 to a maximum number of iterations, given the decoding latency constraint on the system. After the given number of decoding iterations, if convergence to a codeword has not been reached (step 115) the bit log-likelihood ratios are extracted from the decoder and fed into the bit to symbol estimator 800 (step 116).

If a non-iteratively decoded code is employed, the soft coded symbol (or bit) information is fed back into the EM phase estimator via a MUX 606, as shown in FIG. 9.

The bit to symbol estimator block 800 computes symbol estimates from the bit log-likelihood ratios. It has to be noted that the symbol estimates can be computed either in form of hard decision symbols or as likelihoods of the received symbols. In the latter case the EM phase estimator 601 works on likelihood values. The symbol estimates are fed into the MUX 606 (step 117), which selects the information coming from the FEC decoder 700 feedback path.

The symbol estimates are then used in the EM phase detector (steps 106', 107', 108') to derive a new estimate of the phase noise realization. The procedure is then repeated until convergence to a codeword is achieved (block 115), or a maximum number of overall iterations (block 118) of the EM phase estimation and FEC decoding are reached. If neither condition is true, a new iteration takes place (block 119). If instead either condition is true, the decoding is complete (block 120) and the procedure ends (block 121).

Figure 11:
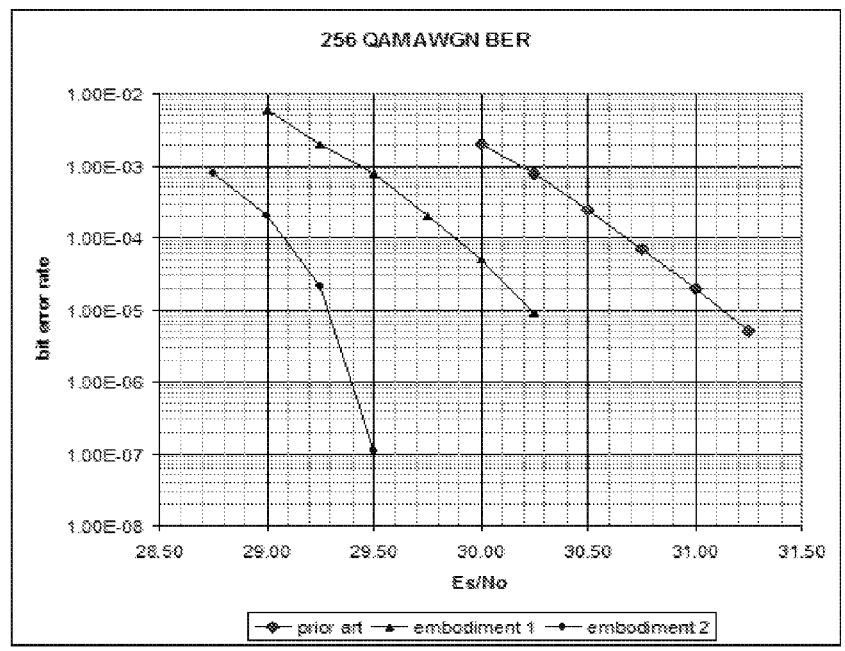
FIG. 11 shows the possible outcome of the present invention in terms of compared performances.

FIG. 11 shows the possible outcome of the present invention in terms of compared performances of a classic solution, and first and second embodiments of the invention as described above.

The advantage of the first embodiment for a 2×2 MIMO system is evident in FIG. 11, when compared to the BER (bit error rate) performance for 256-QAM modulation of a conventional PLL based solution. At a BER level of $10^{-5}$ the new method performs 0.9 dB better than the PLL-based solution.

The advantage of the second embodiment for a 2×2 MIMO system is even more evident in FIG. 11. At a BER level of $10^{-5}$ the method proposed in this second embodiment performs 1.9 dB better than the state-of-the-art solution.

A system that can be used to put the invention into practice has been described schematically with reference to FIGS. 1-10. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method for phase noise detection in a MIMO communication system receiver, the method comprising:
   computing, by the receiver, an initial estimate of phase noise sum processes for the MIMO receiver using received pilot symbols of a received sequence of symbols;
   filtering, by the receiver, the computed initial estimate of the phase noise sum processes;
   interpolating between successive pilot symbol phase estimates of the filtered phase noise sum process estimates to obtain phase estimates for all incoming symbols;
   performing, by the receiver, an expectation maximization (EM) algorithm on the phase estimates for all incoming symbols in order to generate estimates of phase noise realizations that maximize a likelihood function, the likelihood function is defined at least partially by the transmitted sequence of symbols, the received sequence of symbols, and various atomic phase noise processes, wherein the various atomic phase noise sum processes are determined from the phase noise sum processes; and
   outputting, by the receiver, data estimates based at least partially on the estimated phase noise realizations.

2. The method according to claim 1, wherein the EM algorithm is used to compute probabilities of transmitted symbols given the phase noise process characteristics and the received sequence of symbols.

3. The method according to claim 2, wherein the EM algorithm is used to phase tracking for a MIMO channel.

4. The method according to claim 1, wherein the application of the EM algorithm is further refined using improved symbol decisions from a FEC decoding.

5. A MIMO node to detect phase noise in a MIMO communication system, the MIMO node comprising:
  computing means to compute an initial estimate of phase noise sum processes for the MIMO node using pilot symbols of a received sequence of symbols received by the MIMO node;
  a filtering element to filter the computed initial estimate of the phase noise sum processes;
  an interpolation element to interpolate between successive pilot symbol phase estimates of the filtered phase noise sum process estimates to obtain phase estimates for all incoming symbols; and
  the computing means being configured to compute estimates of phase noise realizations from the phase estimates for all incoming symbols using an expectation maximization (EM) algorithm, the estimated phase noise realizations maximize a likelihood function that is defined at least partially by the transmitted sequence of symbols, the received sequence of symbols, and various atomic phase noise processes, wherein the various atomic phase noise processes are determined from the phase noise sum processes;
  demodulation means that outputs data estimates based at least partially on the estimated phase noise realizations.

6. The MIMO node according to claim 5, comprising a FEC decoder connected to the computing means to feed improved symbol decisions to the EM algorithm.

7. A nontransitory computer readable storage medium comprising program instructions that, when executed by a processor, cause the processor to perform a method for detecting phase noise in a MIMO communication system receiver, the method comprising:
  computing, by the processor, an initial estimate of phase noise sum processes for the MIMO receiver using received pilot symbols of a received sequence of symbols;
  filtering, by the processor, the computed initial estimate of the phase noise sum process;
  interpolating between successive pilot symbol phase estimates of the filtered phase noise sum process estimates to obtain phase estimates for all incoming symbols;
  performing, by the processor, an expectation maximization (EM) algorithm on the phase estimates for all incoming symbols in order to generate estimates of phase noise realizations that maximize the likelihood function, the likelihood function is defined at least partially by the transmitted sequence of symbols, the received sequence of symbols, and various atomic phase noise processes, wherein the various atomic phase noise processes are determined from the phase noise sum processes; and
  outputting, by the processor, data estimates based at least partially on the estimated phase noise realizations.

* * * * *